March 5, 1968    R. A. LOUKS ET AL    3,371,652
LIVESTOCK AUTOMATIC WATERING DEVICE
Filed June 8, 1966    2 Sheets-Sheet 1

INVENTORS
ROBERT A. LOUKS
VERNON H. SIETMANN
BY
ATTORNEY

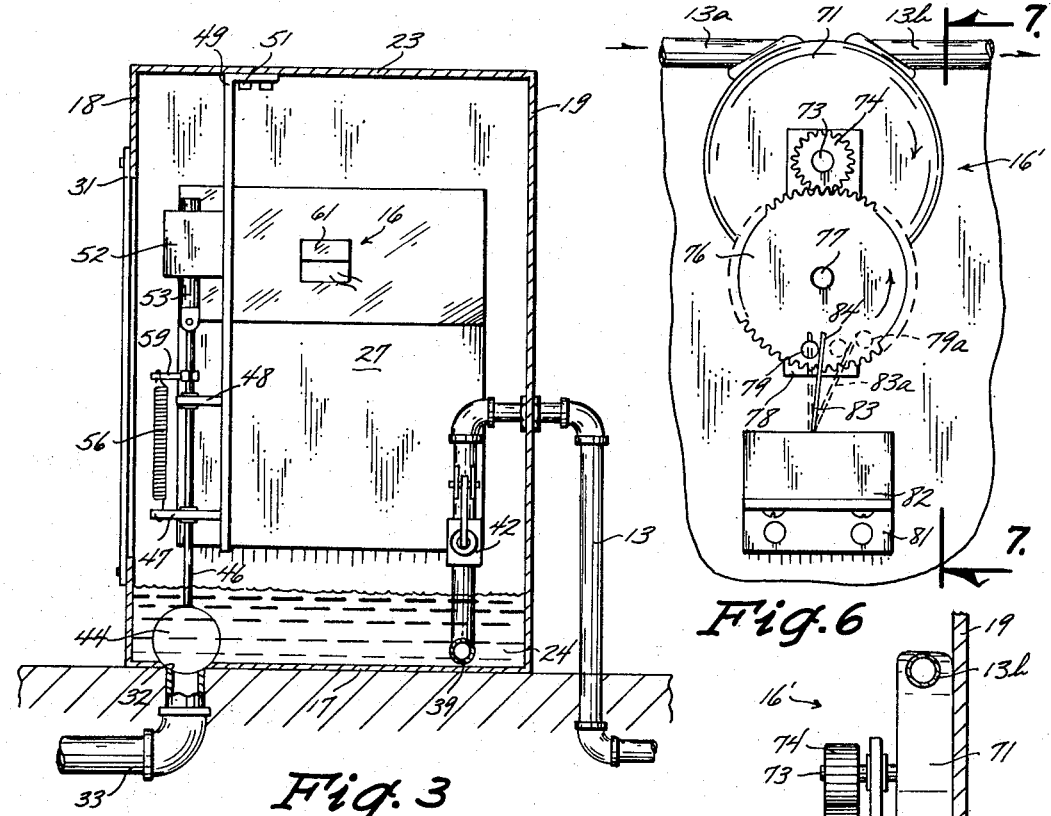
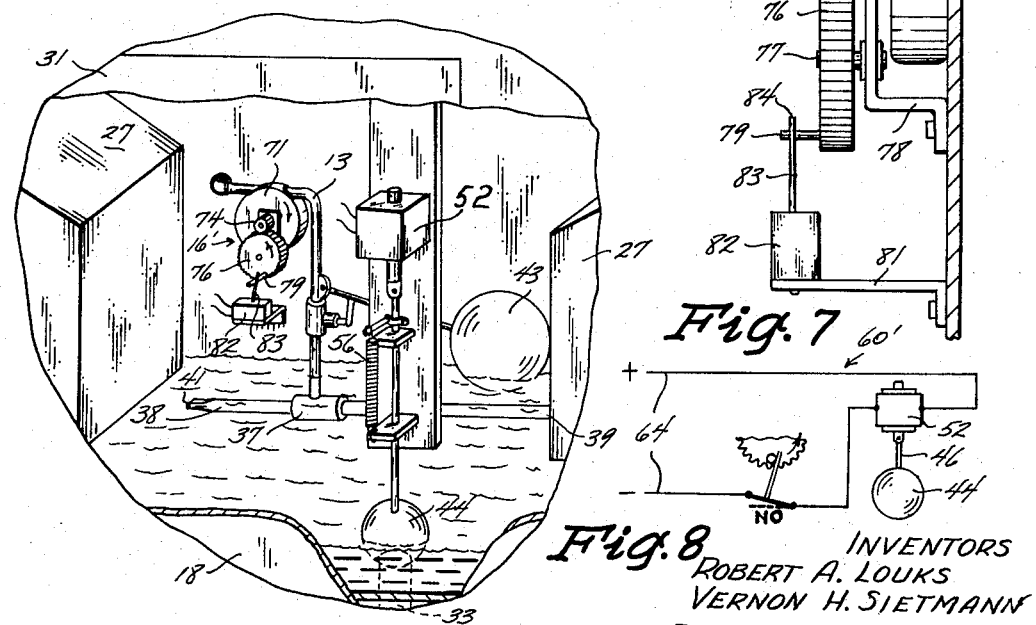
INVENTORS
ROBERT A. LOUKS
VERNON H. SIETMANN
BY
N. Robert Henderson
ATTORNEY

United States Patent Office 3,371,652
Patented Mar. 5, 1968

3,371,652
LIVESTOCK AUTOMATIC WATERING DEVICE
Robert A. Louks, Gilman, Iowa 50106, and
Vernon H. Sietmann, Laurel, Iowa 50141
Filed June 8, 1966, Ser. No. 556,132
8 Claims. (Cl. 119—51.11)

This invention relates to a watering tank and more particularly to an animal watering device.

The supplying of fresh water to farm animals requires an apparatus which operates continuously to supply the water. Such apparatus are in most cases attached to a pipeline from a water pump and frequently incorporate a float valve to maintain the water level constant. One disadvantage of such waterers is the fact that they are difficult to keep clean.

Livestock, particularly cattle and hogs, deposit considerable foreign matter into their water tank in the process of drinking water therefrom. Additionally, the area around and adjacent to the tank is generally well trampled wherein considerable dust is created which is carried aloft by the movement of the animals and by the wind. This dust settles into the tank, contaminating the water thereby.

An object of this invention, therefore, is to provide an animal watering device which simultaneously provides a constant supply of fresh water while effecting automatic self-cleaning of the device.

Another object of this invention is the provision of an animal watering device which automatically, at predetermined intervals, effectively drains the tank in such a manner that not only is the contaminated water removed but also all dirt and debris which has collected in the tank is flushed therefrom.

Still another object of this invention is the provision of an animal watering device which is automatically self cleaned at intervals determined by the quantity of fresh water required to maintain the level of the water in the tank at a predetermined level.

Yet a further object of this invention is the provision of an animal watering device wherein the water and sediment contained therein can be effectively drained, thus obviating the possibility that the water will freeze during cold weather.

A still further object of this invention is the provision of an animal watering device as defined hereinbefore which is contained in a housing, and which is accessible only through hinged doors for sanitation purposes.

Another object of this invention is the provision of an improved automatic livestock watering device combining means for periodically draining the tank with means for simultaneously effecting a suspension of dirt and other foreign matter in the water being drained, so as to scour the bottom of the tank and flush out said dirt and foreign matter at the same time with the draining action.

It is another object of this invention to provide an automatic animal watering device capable of attaining these objectives which is free from complicated electrical and mechanical devices with which the average farmer is unfamiliar.

A further object of this invention is the provision of an animal watering device which is economical to manufacture, compact and functional in use, and simple but rugged in construction.

These objects, and other features and advantages of this invention will become more readily apparent upon reference to the following description, when taken in conjunction with the accompanying drawings, wherein:

FIG. 3 is a sectional view taken along the line 3—3 in FIG. 2;

FIG. 5 is an enlarged fragmentary perspective view of a modified embodiment of the control mechanism for the flushing operation;

FIG. 6 is a greatly enlarged fragmentary elevational view of the control mechanism;

FIG. 7 is a side view as seen along the line 7—7 in FIG. 6; and

FIG. 8 is a wiring diagram of the modified embodiment.

Figure 1:
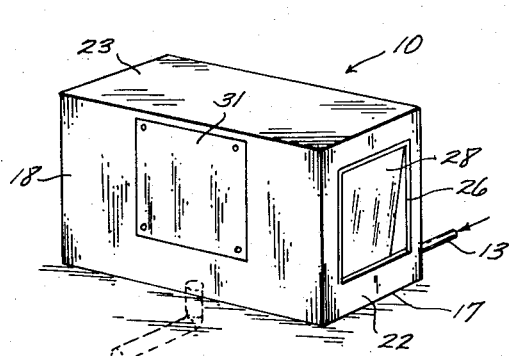
FIG. 1 is a perspective view of the animal watering device of this invention.

Referring now to the drawings, the animal watering device of this invention is indicated generally at 10 in FIG. 1.

Figure 2:
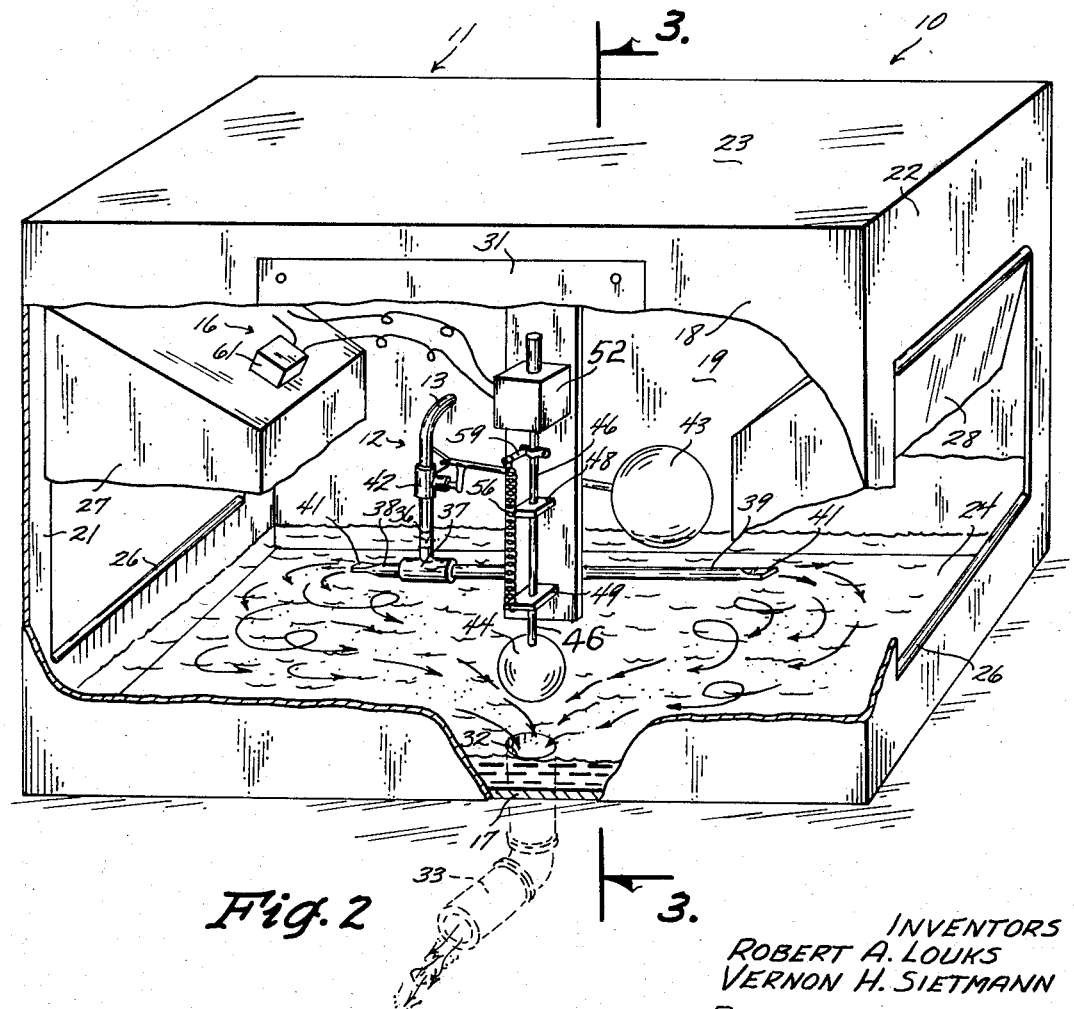
FIG. 2 is an enlarged perspective view with certain parts broken away and others shown in section for clarity of illustration.

Generally, the watering device 10 comprises a housing 11 (FIG. 2), a water supply mechanism 12 disposed in the housing 11 and fluidly connected by an inlet conduit 13 to a water source (not shown), a valve drain mechanism 14 disposed in the housing 11 for draining the water therefrom, and a control apparatus 16 electrically connected to the drain mechanism 14 for the operation thereof.

More specifically, the rectangularly shaped housing 11 (FIG. 2) comprises a bottom 17; a pair of side walls 18 and 19, a pair of upstanding walls 21 and 22, and a top 23. The walls and the bottom are secured together, as by welding, to form a watertight tank 24.

The end walls 21 and 22 (FIG. 3) each have a rectangular shaped cut-out 26 formed therein, which is of sufficient size to permit the entrance therein of the head of an animal. A pair of enclosures 27, each open on one side and at the bottom thereof, are disposed in the housing 11, with each enclosure mounted with the open side in alignment with one of the cut-outs 26 (as best noted in FIG. 3). A hinged door 28 (FIG. 1) is mounted over each of the cut-outs and is swingable inwardly to expose the tank 24 via each enclosure 27. Upon removing the pressure thereagainst, the door 28 will return to a closed position thus effectively eliminating the entrance of small birds, small animals and other foreign matter into the housing 11.

One of the side walls, for example 18 (FIG. 3) has a passage 29 formed therein which is covered by a removably mounted plate 31. The purpose of the passage 29 is to permit access to the inside of the housing 11 for maintenance and adjustment of the internal parts contained therein.

A drain outlet 32 (FIG. 2) is formed in the bottom 17 of the tank 24, wherein the water can be effectively drained from the tank. Fluidly connected to the bottom 17, at the outlet 32, is a drain pipe 33 for carrying off the matter to be drained from the tank.

The inlet conduit 13 (FIG. 2) enters the housing 11 in the side wall 19 at a location normally well above the desired level of water therein and depends toward the bottom 17, with a lower end 36 disposed adjacent thereto. The end 36 is fluidly connected to a T 37 which is positioned substantially contiguous to the bottom 17. A pair of axially aligned, oppositely extended pipes 38 and 39 are fluidly connected to the T 37, with each pipe 38 and 39 disposed substantially parallel with the plane of the bottom 17. The diameter of the outer end 41 of each pipe 38 and 39 is considerably reduced, as by crimping, forming thereby a jet-type connected nozzle and thus causing the water flowing therefrom to discharge under great pressure and velocity, thus creating a so called jet action.

Interposed in the conduit 13 (FIG. 2) between the opening 34 and the T 37, is a valve 42. The valve 42 is controlled by a valve float 43 which automatically closes the valve and thus the inlet conduit 13 to shut off the supply of water when the water in the tank reaches a predetermined level. Conversely, when the water level falls below a second predetermined level the valve 42 is opened by operation of the float 43, and water flows into the tank through the pipes 38 and 39.

The drain mechanism 14 (FIG. 2) comprises a ball valve 44 having a diameter greater than the diameter of the drain outlet 32, and which is disposed over and normally closes the outlet 32. Secured to the ball valve 44 is a verticaly disposed rod 46, slidably mounted in a pair of brackets 47 and 48 (FIG. 3) which are attached, one above the other, to a mounting element 49. The vertically disposed mounting element 49 is attached to the top 23 by a pair of bolts 51.

Mounted above the upper bracket 48 (FIG. 3) is a solenoid 52, wherein the vertically disposed core 53 therein is secured to the rod 46. Upon an upward movement of the core 53, in response to energization of the solenoid 52, the ball valve 44 is movable from a first position (as best shown in FIG. 3) wherein the outlet 32 is closed, to a second position (FIG. 2) wherein the outlet 32 is open.

The rod 46, and thus the ball valve 44, is biased downwardly as viewed in FIG. 5. The biasing unit 54 comprises a spring 56, interconnected between the lower bracket 47 and a pin 59. The pin 59 is secured to the rod 46 between the upper bracket 48 and the solenoid 52. The unit 54 is employed to move the valve 44 from the second position to the first position, after de-energization of the solenoid 52, and to hold the valve in the first position, thus preventing the draining of the tank 24 and permitting same to fill with fresh water to the desired level.

Figure 4:
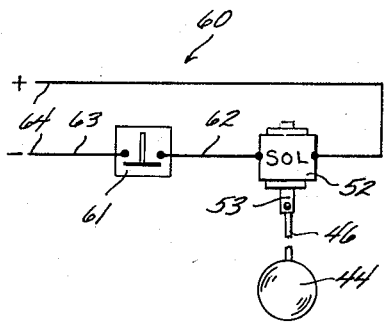
FIG. 4 is a wiring diagram of the electrical components.

The control mechanism 16 (FIGS. 2 and 4) comprises a clock-timer operated switch 61 having one pole connected by a wire 62 to the solenoid 52 and the other pole connected by a wire 63 to one side of a power source 64, such as a battery. The other side of the power source 64 is connected by a lead 66 to the other side of the solenoid. The clock operated switch 61, at predetermined timed intervals is operable to close the circuit 60 between the power source 64 and the solenoid 52, thus energizing the solenoid 52 and causing the ball valve 54 to move upwardly thus allowing the tank 24 to drain.

In operation, the tank 24 (FIG. 2) is filled with the ball 43 floating on the surface of the water. When the ball rises, because of the level of water in the tank 24, to a predetermined height the valve 42 closes. As water is consumed from the tank, the water level lowers and the ball 43 moves downwardly until reaching a second predetermined level, then automatically opening the valve 42 to supply fresh water to the tank until the normal level is again reached.

At predetermined intervals the clock-timer operated switch 61 is activated, thus closing the circuit and energizing the solenoid 52. The energized solenoid 52 causes the ball valve 44 to move upwardly to its second position to open the outlet 32 and drain the contents of the tank 24. When the water level reaches the second predetermined level the valve 42 opens and water flows into the tank through the pipes 38 and 39.

Due to the placement of the drain outlet 32 intermediate the walls 21 and 22, and intermediate the nozzles 41, the jet action of the water emerging through the partially crimped ends 41 causes the discharge water to flow with considerable velocity against the end walls 21 and 22 and a scouring and whirlpool or eddy action is set up in the tank. This eddy action effectively removes foreign matter from the bottom of the tank 24 and causes it to remain suspended in the water until it drains from the tank 24.

After a predetermined time interval, the switch 61 opens and the solenoid is de-energized. The biasing unit 54 causes the valve 44 to return to its first position, thus closing the outlet 32 and the tank 24 will refill as described hereinabove. It should be noted that in the failure or absence of electricity, a manual raising of the rod 46 would effect the same scouring and whirlpool action above.

A modified embodiment of the control mechanism is depicted generally at 16′ in FIGS. 5–8, wherein the occurrence of the combined draining and flushing of the tank, and also the length thereof, is determined by the quantity of water passing into the tank. Like parts in FIGS. 5–8 are indicated by like reference numbers, as compared to the embodiment of FIGS. 1–4.

The modified embodiment of the timing device 16′ (FIGS. 6 and 7) comprises a fluid tight, impeller blade housing 71 attached to the side wall 19. A pair of arcuately spaced, transversely aligned holes (not shown) are formed in periphery of the blade housing 71. The conduit 13 is separated at 13a and 13b with the two ends formed thereby fluidly connected to the blade housing 71 via the holes. A shaft 73 is rotatably mounted at the radial axis of the blade housing 71 to an impeller blade wheel (not shown) mounted thereon, wherein as water flows through the conduit 13 and through the blade housing 71 it impinges on the wheel to cause it to rotate.

The shaft 73 carries a small gear 74, which meshes with a large gear 76 secured to a second shaft 77 rotatably mounted on an L-shaped bracket 78. The bracket 78, disposed between the blade housing 71 and the gears 74 and 76, is attached to the side wall 19, as best observed in FIG. 7. Secured to the outer facing of the large gear 76, and spaced outwardly from the radial axis thereof, is an outwardly extending lug 79.

Movably mounted to the side wall 19 and spaced below the bracket 78 is a brace 81 (FIG. 7), for supporting an on-off switch 82, biased in a normally open position, and having an upstanding toggle rod 83 pivotally mounted thereon and operable to close the switch 82. The toggle rod 83 extends toward the radial axis of the large gear 76 (see FIG. 6), wherein the upper end 84 of the rod 83 is disposed in the arcuate path of the lug 79. The switch is interposed in the electric circuit 60 (FIG. 8), displacing the clock-timer switch 61 (FIG. 4), wherein with the switch 82 normally open current does not flow through the circuit 60′. As before, the solenoid controlled valve 44 is closed over the drain 32 in this condition.

In operation, as water is required to pass through the conduit 13 (FIG. 5) to replenish the quantity consumed by the livestock, the impeller blade wheel rotates thus causing the small gear 74 to rotate. The rotation of the small gear 74 (FIG. 6) causes the large gear 76 to rotate with a corresponding movement of the lug 79. When a predetermined quantity of water has flowed into the tank 24, the lug 79 contacts the toggle rod 83. Additional use of water thus causes the rod 83 to pivot to the right to the full line position of FIG. 6, thus closing the switch 82. The solenoid 52 is then energized and the tank 24 is simultaneously drained and flushed in the vigorous manner described hereinabove.

The water used to flush the tank causes the lug 79 to continue its rotation and to continue to move the rod 83 to the right, as depicted in FIG. 6, until the lug 79 rotates to a position at 79a which is out of contact with the rod 83 at a position 83a wherein the rod returns to vertical and the switch 82 is opened. The ball valve 44 is then automatically closed to effect a re-filling of the tank 24.

To increase the period of time of flushing and draining, the brace 81 can be adjusted upwardly, wherein the rod 83 remains pivoted to the right, a longer period of time, as the lug 79 must rotate through a greater arc before contact between the lug 79 and the rod 83 is broken. Conversely, to decrease the length of time for flushing and draining, the brace 81 is adjusted downwardly thus decreasing the time the switch 82 is held in a closed position.

Although a preferred embodiment and one modified embodiment of this invention have been described and disclosed hereinbefore, it is to be remembered that various other modifications and alternate constructions can be made thereto without departing from the true spirit and scope of this invention as defined in the appended claims.

We claim:

1. An animal watering device comprising in combination:
   a tank from which animals can drink, said tank having a wall and a floor, said floor having a drain outlet formed therein;
   means for supplying water to said tank, said water supplying means including a nozzle for discharging water therefrom, said nozzle being spaced adjacent said wall and constituting a means for discharging the water against said wall and rebounding the water in a whirlpool manner, setting up a whirlpool scouring action and effectively suspending foreign matter in the water contained in said tank;
   valve means disposed in said tank and movable from a first position wherein said outlet is closed to a second position wherein said outlet is open thus allowing the water and debris in said tank to be drained therefrom concurrently with said scouring action; and
   control means connected to said valve means and operable to move said valve means from the first position to the second position.

2. An animal watering device as defined in claim 1, and further wherein said valve means includes a valve disposed over said outlet, and movable from said first position wherein said outlet is closed to said second position wherein said outlet is open, and a solenoid connected to said valve and operable to move said valve to said second position; said control means operable to energize said solenoid.

3. An animal watering device as defined in claim 2, and further wherein said valve means includes biasing means attached to said valve for moving said valve to said first position.

4. An animal watering device as defined in claim 3, and further wherein said water supply means includes a conduit fluidly connected on one end thereof to a source of water, a float valve interposed in said conduit, said float valve responsive to the level of the water in said tank and movable from a first position wherein said conduit is closed to a second position wherein water can flow into said tank, and outlet means fluidly connected to the other end of said conduit, said outlet means disposed beneath the surface of the water in said tank, wherein the water discharged from said outlet means creates eddies in said tank.

5. An animal watering device as defined in claim 4, and further wherein said outlet means includes a T section fluidly connected to said conduit and a pair of pipes disposed beneath the surface of the fluid in said tank, one end of each of said pipe fluidly connected to said T section and the other end of each of said pipes having a jet-type nozzle formation wherein the water discharged therefrom has velocity sufficient, upon striking the walls of said tank, to create a whirlpool action, about the bottom of the tank.

6. An animal watering device as defined in claim 5, and further wherein said control means is automatically operated, with said automatic operation being variable to regulate thereby energization of said solenoid.

7. An animal watering device as defined in claim 6, and further wherein said control means includes a fluid volume measuring device fluidly connected to said conduit, and a switch electrically connected to said solenoid, said measuring device operable to move said switch, wherein the closing of said switch, from a normally open position, is determined by a predetermined volume of fluid flowing through said conduit and the opening of said switch is based on a second predetermined volume of fluid flowing through said conduit after said valve is opened.

8. An animal watering device as defined in claim 7, and further wherein said tank is formed by a bottom, a pair of side walls, and a pair of end walls extending upwardly from said bottom, and a top secured to said walls at the the top thereof; said end walls each having a cutout formed therein of sufficient size to permit the entrance therein of the head of an animal; a pair of enclosures, each open on one side thereof and on the bottom, said enclosures disposed in said housing with each enclosure mounted, on one of said end walls with the open side thereof in alignment with one of said cutouts; a hinged door mounted over each of said cutouts, said door swingable inwardly when pushed by the animal.

References Cited

UNITED STATES PATENTS

| | | | |
|---|---|---|---|
| 1,172,584 | 2/1916 | Conrad | 119—78 |
| 2,701,548 | 2/1955 | Wolfe | 119—51.5 |
| 2,711,750 | 6/1955 | Norcross | 137—624.11 X |
| 2,782,760 | 2/1957 | Wolfe | 119—51.5 |
| 2,865,328 | 12/1958 | Hostetler | 119—79 |
| 2,967,004 | 1/1961 | Lipshutz | 222—70 |
| 3,106,907 | 10/1963 | Godshalk | 119—78 |
| 3,150,639 | 9/1964 | Sereda | 119—78 |
| 3,195,512 | 7/1965 | Jackson | 119—51.11 |
| 3,295,500 | 1/1967 | Blough | 119—51.5 |
| 3,306,263 | 2/1967 | Johnson | 119—80 X |

ALDRICH F. MEDBERY, *Primary Examiner.*